Nov. 4, 1952    C. CARLSON    2,616,460
ROUTER FOR REMOVING DEFECTS FROM PLYWOOD
Filed May 22, 1950    2 SHEETS—SHEET 2
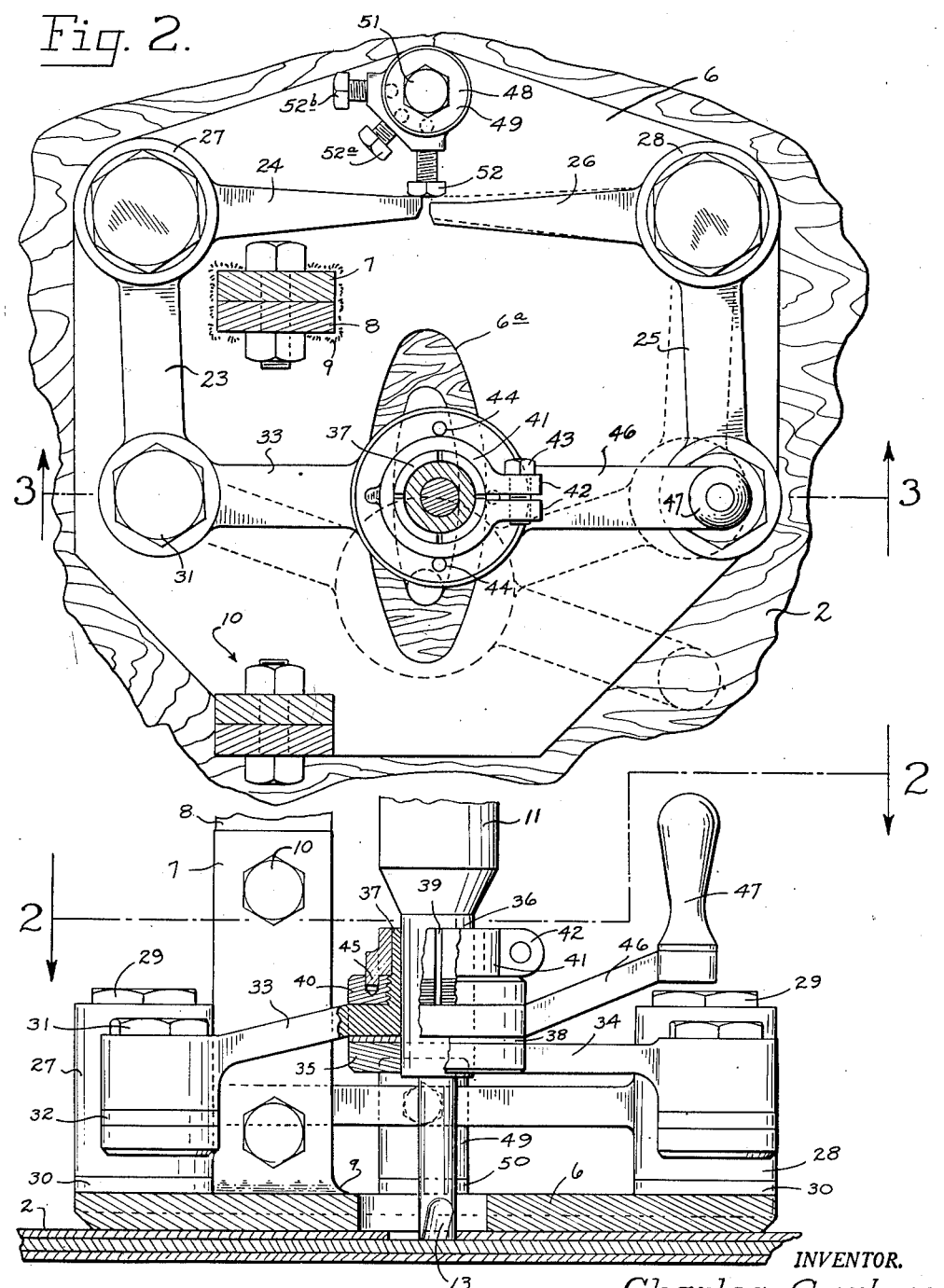
INVENTOR.
Charles Carlson
BY M. E. Ramsey
Atty.

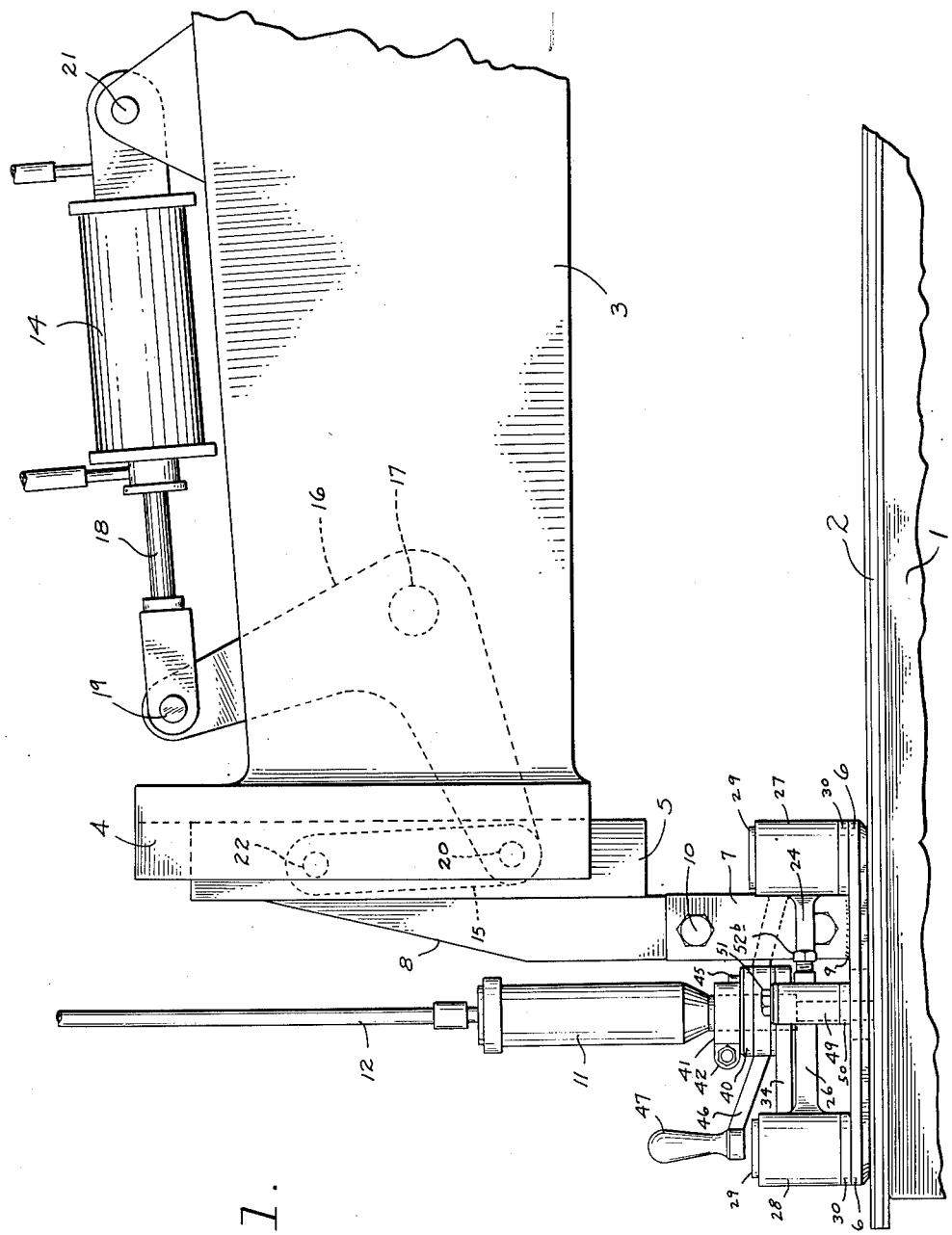

Patented Nov. 4, 1952

2,616,460

UNITED STATES PATENT OFFICE 2,616,460

ROUTER FOR REMOVING DEFECTS FROM PLYWOOD

Charles Carlson, Vancouver, Wash.

Application May 22, 1950, Serial No. 163,555

7 Claims. (Cl. 144—136)

This invention relates to veneer router machines, and has for one object thereof the provision of such a machine for routing an elliptical shaped hole in one layer of a piece of plywood.

Another object of my invention is the provision, in a routing machine, of a novel system of arms for guiding the movement thereof within the limits of an elliptical shaped pattern.

The production of plywood, a board consisting of a number of thin layers of veneer glued together so that the grain of each layer is at right angles to that of its neighbor, is a major industry in the Pacific Northwest. Plywood produced in this section of the United States is, however, subject to the same natural imperfections as plywood produced elsewhere. Thus, the usual individual ply of the Douglas fir plywood industry is a continuous strip or sheet of wood, usually one-eighth inch thick, peeled from a log. The sheets or plies often contain such natural defects as knots, pitch pockets, unequal surfaces, and natural broken spaces. If such defects are present in the outermost plies of a finished plywood board, the structural strength is somewhat reduced and the plywood is classified as second quality with the obvious result that it cannot thereafter command a top price in the market. Accordingly, it is common practice in the Pacific Northwest Douglas fir plywood industry to place a finished plywood board on a horizontal inspection table, to locate, by inspection, the defects in the top layer thereof, and to remove these defects by cutting a boat-shaped hole with pointed ends in the top ply about the defect and, thereafter, filling the said hole with a patch. Semiautomatic machines used to cut the pointed boat-shaped holes in one ply of a piece of plywood are commonly termed "routers" in the industry. Such routers normally employ a reciprocating router knife ground to conform to the size hole desired. It is, accordingly, within the scope of one of the objects of my invention to provide a veneer router of new and unique construction which forms an elliptical hole with rounded, rather than pointed corners.

One object of my invention is the provision of a rotary cutting head veneer router which will repeatedly form a patch hole of uniform elliptical shape and uniform single ply depth in a plywood board.

Another object of my invention is the provision of multiple adjusting means on a veneer router whereby the elliptical pattern formed by the router may be varied in area to allow for variable defects in an individual ply and whereby the pattern may be varied in vertical depth to allow for various ply thicknesses.

Still another object of my invention is the provision of a system of arms for guiding the movement of a routing machine whereby the element of human error is materially reduced and a uniform elliptical pattern free of feathered edges and splinters is produced.

These and other objects and advantages of my invention are hereinafter described with reference to the accompany drawings, in which:

Fig. 1 is a side view of the veneer router of my invention showing the hydraulic carrier lift and pneumatic drill motor therefor;

Fig. 2 is a plan view, partially in section, taken substantially on the line 2—2 of Fig. 3 and showing the system of arms for driving the elliptical pattern movement of my router; and Fig. 3 is a detailed end view, partially in section, taken substantially on the line 3—3 of Fig. 2 and showing the adjustable suspension system and guide arm for the pneumatic router of my invention.

The veneer router of my invention is suspended above a horizontal work table 1, having thereon a plywood piece 2, by means of a horizontal carrier member 3. The carrier member 3 is made rigid by securely attaching the same either to the work table 1 or to the floor upon which the work table rests (not shown). Vertically movable within guideways 4 on the end of the carrier member 3 a slide 5 is mounted. This slide is operatively joined with the base 6 which carries my router by means of two brace members 7 fastened to either side of a connecting piece 8. The brace members 7 and the base 6 may be joined by any suitable means, as for example, by a fillet weld 9 and the brace members may be joined to the connecting piece 8 by nuts and bolts 10, although neither of these means of joining the pieces is critical.

Rotatably secured above the base 6 of my invention, by structure to be hereinafter described, I have shown a pneumatic motor 11 fed by an air hose 12. This pneumatic motor drives the cutting head 13 of my router at a speed of approximately forty thousand R. P. M. On the other hand, the hydraulic motor 14 shown in Fig. 1 of my drawings provides vertical actuation for my router. Thus, by means of a link 15 and a bell crank lever 16 pivotally mounted at 17, I join the slide 5 and the connecting rod 18 of the hydraulic motor. The bell crank lever 16 is rotatably joined to both the connecting rod 18 and the link 15 by means of two pivots 19 and 20, respectively. The hydraulic motor 14 is anchored at one end by means of an axle pin 21 to the carrier member 3. The pivot connections thus described allow for vertical actuation of my veneer router since, when hydraulic pressure is fed to the left end of the hydraulic motor 14, the piston therein moves toward the right carrying with it the connecting rod 18 and the upper arm of the bell-crank lever 16. This causes the bell-crank lever 16 to pivot about 17 and vertically lift the pivot 20 and the link 15. Since the link 15 is secured to the slide 5 by means of a pin 22, and the slide 5 and the base 6 will move vertically upward. Conversely, when pressure fluid is fed to the right end of the hydraulic motor 14 and exhausted from the left end thereof, the connecting rod 18 moves to the left, as seen in Fig. 1, carrying the bottom arm of the bell-crank lever 16 downwardly. The slide 5 and the base 6 are thus forced down upon the plywood piece 2 to securely hold the piece against the work table 1.

In Fig. 2 of my drawings, I have shown a system of allochiral arms for guiding the movement of my veneer router in an elliptical pattern. This system comprises a left hand bell-crank lever having perpendicular arms 23 and 24 and an allochiral and oppositely arranged right hand bell-crank lever having perpendicular arms 25 and 26. The left and right hand bell-crank levers are mounted for rotary movement about their fulcrums, in the plane of their arms, on two rock shafts 27 and 28, respectively. Each rock shaft is secured to the base 6 by means of a hexagonal bolt 29 (see Fig. 3) and spaced from the base 6 for rotation relative thereto by means of a shim 30. Rotatably mounted on the end of the arm 23, as by means of a hexagonal bolt 31 and a spaced member 32 is a left hand pitman rod 33. Similarly, rotatably mounted upon the arm 25 by identical means is a right hand pitman rod 34. The right hand pitman rod 34 is arranged in a horizontal plane and terminates in a circular collar 35. The circular collar 35 is an element of the mechanism which my invention employs to support the body portion 36 of my router. Since the left pitman rod 33 and right pitman rod 34 must rotate with respect to one another, I prefer to form the hole in the circular collar 35 somewhat larger than the body portion of the router 36. This allows the right pitman rod 34 to rotate with respect to the left pitman rod 33 and the body portion 36 both, since these latter two elements are secured together. The left ptiman rod 33 is disposed at an angle to the horizontal so as to encircle the body portion 36 of the router above the circular collar 35. This left pitman rod 33 terminates in an externally threaded sleeve 37 (see Fig. 3) and is spaced from the circular collar 35 by means of a rotation shim 38. The sleeve 37 is splined as at 39 and forcibly crimped to securely hold the body portion 36 of the router by means of a threaded collar 40 and a clamp 41. I prefer to construct the clamp 41 with ears 42 through the holes in which a bolt 43 may be threaded to compress the clamp 41 about the sleeve 37. Furthermore, as best seen in Fig. 2, the threaded collar 40 is formed with four equidistant female depressions 44 spaced about the periphery thereof and into which a male member 45 formed on the clamp 41 is complementarily fitted. Such a fitting prevents relative rotation between the threaded collar 40 and the clamp 41. Formed integrally with the left pitman rod 33, I have shown a shaft 46 carrying a guide handle 47. This handle is used to guide the router of my invention about the elliptical path defined by the system of arms above described.

In Fig. 2, I have shown the adjustable stop means 48 used to vary the area of the elliptical pattern which my veneer router describes. This adjustable stop means 48 comprises a rotary head portion 49 secured to the base 6 for rotation relative thereto by means of a bolt 51 and a shim 50. Three adjustable stop bolts 52, 52a and 52b are screwed into bolt holes tapped in the periphery of the rotary head 49 of the adjustable stop means. As shown in Fig. 2, the stop bolt 52 is in operative position to cooperate with the rotational movement of the bell crank lever arms 24 and 26. If the rotary head 49 is turned approximately 45° counterclockwise, the stop bolt 52a will be brought into operative position. Thereafter, the bell crank-lever arms 24 and 26 will cooperate with this shorter stop bolt to define a larger elliptical pattern at the router head. Each of the stop bolts, therefore, defines a different elliptical pattern area.

In the operation of my veneer router, let it be assumed that a plywood piece 2 has been placed upon the work table 1 beside the router. A control (not shown) for the hydraulic motor 14 is then moved and hydraulic fluid under pressure enters the left hand end of the hydraulic motor 14. As previously described, this causes the piston in the hydraulic motor to move to the right carrying therewith the connecting rod 18 and the upper arm of the bell-crank lever 16. The slide 5 is thereby made to rise in a vertical direction carrying with it the base 6 of my veneer router. The plywood piece is then moved about on the work table 1 so that a natural imperfection, such as a pitch pocket, is located under the base 6 of the router in such a position as to be visible through the elliptical hole 6a formed in the base. The operator then trips his control and the hydraulic motor 14 causes the connecting rod 18 to move to the left as seen in Fig. 1, carrying therewith the bell crank lever 16, the link 15, and the slide 5. The base 6 of the router thus descends upon the plywood piece and securely holds the same in place against the work table 1. In a busy plywood company, the plywood sheets to be routed are fed to the work table 1 in a continuous stream. Thus, the pneumatic motor 11 driving the cutting head 13 of the router is left operating at all times.

As the base of the router comes to rest against the piece of plywood, the cutting head 13 of the router will make an initial hole in the top ply of the board. This initial hole and, in fact, all cutting by the cutting head 13, must be to exactly the depth of one ply of the plywood. As best seen in Fig. 3, I have made the depth to which my router cutting head 13 penetrates variable by means of the threaded collar 40 and the clamp 41. For example, if the veneer router has been previously used with plywood formed of one-eighth inch thick plies, and a different sized ply is now encountered, the bolt 43 is loosened in the ears 42, the clamp 41 is lifted so that the male member 45 clears the female depression 44, and the threaded collar 40 is loosened. The body portion 36 of the router is then vertically adjusted to the desired position. Thereafter, the threaded collar 40 is tightened, the clamp 41 is adjusted with the male member 45 inserted in a different female depression 44 or, perhaps, in the same depression, and the bolt 43 is tightened to bring the ears 42 together.

With the plywood defect in place beneath the elliptical hole 6a in the base, the operator grasps the guide handle 47 and proceeds to move the body portion 36 and the cutting head 13 of the router back and forth across the limits of the elliptical pattern defined by the system of arms. The means by which this system of arms defines an elliptical pattern will now be described with reference to Fig. 2. Let it be assumed the router head and arms are in the position shown in full lines in Fig. 2. If the operator manipulates the guide handle 47 so that the cutting head 13 is made to move toward the stop 52 and, at the same time, the operator bears slightly to the right, one side of an ellipse will be described by the cutting head. This movement follows since, as shown, arm 24 rests against the stop 52, maintaining the arm 23 rigid. The pitman rod 33, however, is free to rotate about the end of the arm 23 and will thus describe an arc of a circle the radius of which is equal to the length of the pitman rod 33. Since the arms 25 and 26 and the pitman rod 34 are all free to move at this moment, the path thus described by the cutting head 13 will be that of the circumference of a circle centered about the junction point of the arm 23 and the pitman rod 33. The limit of movement of the cutting head 13 toward the stop 52 is defined by the extent to which the arm 26 can rotate before striking the stop bolt 52. When arm 26 strikes the stop bolt 52, the arms 25 and 26 will be in the position shown in dashed outline in Fig. 2. Thereafter, the arm 25 is held rigid and the router pivots on the two pitman rods 33 and 34 only, to thereby describe the end of the elliptical pattern. If the operator thereafter manipulates the guide handle 47 so as to apply a force directing the cutting head 13 away from the stop 52 and slightly to the left, the left hand periphery of the ellipse of Fig. 2 will be described. During this portion of the movement, the arms 26 and 25 remain stationary with the arm 26 bearing upon the stop bolt 52. Arm 24, however, moves away from the stop bolt 52 and the cutting head describes a path defined by the circumference of a circle whose center is located at the intersection of the pitman rod 34 and the arm 25. When the cutting head has moved past the half way point of its path down the left hand side of the elliptical pattern, the arms 23 and 24 have reached the limit of their movement and, thereafter, arm 24 begins to again move toward the stop bolt 52. The limit of movement of the cutting head 13 away from the stop bolt 52 is described by the limiting position of the arms and pitman rods as shown in dashed outline in Fig. 2. As should now be obvious, the area of the elliptical pattern described by the cutting head 13 is limited by the stop bolt 52. Thus, if the stop bolt 52a is rotated into position so that the arms 24 and 26 abut thereagainst, the elliptical pattern described by the cutting head 13 will be somewhat larger in area since the arms can move farther before coming to stop against the stop bolt. In actual operation, the operator does not manipulate the guide handle 47 to describe an elliptical path but rather moves the cutting head back and forth across the area to be routed and the limits of this area are defined by the elliptical path previously described. This is necessary since the ply to be routed is secured to its neighboring ply by a synthetic resin which bonds the entire contact area of the ply surfaces together. If the mere elliptical outline were routed, leaving an elliptical-shaped piece remaining in the middle of the hole, the said piece would still be bonded to its neighbor and could not be easily removed.

One of the advantages found to result from the use of the veneer router of my invention is that the hole routed from the plywood is formed with rounded corners. I have made this advantage possible by correlating the movement of my unique system of guide arms with a high speed pneumatic router. The cutting head of the router of my invention rotates at a speed of approximately 40,000 R. P. M. This speed is essential to the formation of rounded corners in the elliptical pattern since the small end corners thereof are formed while the cutting head is traveling across the wood grain. My experience has taught the necessity of utilizing such a high speed cutting head in order to obviate feathering and splintering of the wood about the elliptical hole at the ends thereof.

The veneer router of the instant invention forms a hole, the sides of which are not beveled. Such a hole may be filled with any well known type of veneer patch but I prefer to utilize the beveled patch disclosed in my copending application entitled Veneer Patch and Method, filed May 22, 1950, Serial Number 163,556.

From the foregoing it will be seen that, in accord with the objects of my invention, I have provided a unique system of guide arms for a veneer router which system will cause the router to move in an elliptical pattern of adjustable area. Furthermore, the limiting pattern described by the veneer router of my invention produces uniform holes over long periods of operation. The entire mechanism is sturdy and is adjustable vertically to route holes in plywood boards of varying thicknesses.

I claim:

1. A machine for routing an elliptical pattern, comprising two allochiral bell crank levers oppositely mounted for rotation about their fulcrums in a plane common to the arms thereof, a single stop means common to one arm of each bell crank lever and mounted within the path of movement thereof to limit by abutment the rotation thereof in one direction, said single stop means being adjustable along said paths of movement to allow various amounts of rotation by varying the position of abutment, a pitman rod rotatably carried by each bell crank lever other arm, said pitman rods carrying means rotatably supporting a router therebetween, said router being vertically adjustable with respect to said latter means to select a desired depth of cut for said elliptical pattern.

2. A machine for routing an elliptical pattern, comprising two oppositely disposed bell crank levers mounted at the fulcrums thereof for rotation in a plane common to the arms thereof, stop means common to one arm of each bell crank lever for limiting the rotation thereof, said stop means being adjustable and including a rotary head defining three stop positions, a pitman rod rotatably carried by another arm of each said bell crank lever, said pitman rods rotatably supporting a router therebetween, and handle means for moving the router in an elliptical path defined by the rotational limit of said bell crank levers, said handle means forming an extension of one of said pitman rods.

3. A machine for routing an elliptical pattern, comprising two oppositely disposed bell crank levers mounted at the fulcrums thereof for rotation in a plane common to the arms thereof, each said bell crank lever having the arms thereof substantially perpendicular, stop means common to one arm of each bell crank lever for limiting the rotation thereof, said stop means being adjustable and including a rotary head defining three stop positions, a pitman rod rotatably carried by another arm of each said bell crank lever, said pitman rods rotatably supporting a router therebetween, said router support including means to adjust the router depth of cut, and handle means for moving the router in an elliptical path defined by the rotational limit of said bell crank levers, said handle means forming an extension of one of said pitman rods.

4. A machine for routing an elliptical pattern, comprising two oppositely disposed bell crank levers mounted at the fulcrums thereof for rotation in a plane common to the arms thereof, stop means common to one arm of each bell crank lever for limiting the rotation thereof, a pitman rod rotatably carried by each said bell crank lever, said pitman rods supporting a router therebetween, said router support including means to adjust the router depth of cut, said means to adjust comprising a splined sleeve on one of said pitman rods and a collar threaded thereabout for the complementary compression of said splined sleeve against the router body, and handle means for moving the router in an elliptical path defined by the rotational limit of said bell crank levers, said handle means forming an extension of one of said pitman rods.

5. A machine for routing an elliptical pattern, comprising a horizontal base member carrying two vertical rock shafts, two oppositely disposed bell crank levers mounted at the fulcrums thereof on said rock shafts for rotation in a plane common to the arms thereof, stop means common to one arm of each bell crank lever for limiting the rotation thereof, said stop means being adjustable and including a rotary head defining three stop positions, a pitman rod rotatably carried by each said bell crank lever, said pitman rods supporting a router therebetween, said support including means to adjust the router depth of cut, said means to adjust comprising a splined sleeve on one of said pitman rods and a collar threaded thereabout for the complementary compression of said splined sleeve against the router body, and handle means for moving the router in an elliptical path defined by the rotational limit of said bell crank levers.

6. A machine for routing an elliptical pattern, comprising a horizontal base member carrying two vertical rock shafts, two oppositely disposed bell crank levers mounted at the fulcrums thereof on said rock shafts for rotation in a plane common to the arms thereof, each said bell crank lever having the arms thereof substantially perpendicular, stop means common to one arm of each bell crank lever for limiting the rotation thereof, said stop means being adjustable and including a rotary head defining three positions, a pitman rod rotatably carried by another arm of each said bell crank lever, said pitman rods rotatably supporting a router therebetween, said router support including means to adjust the router depth of cut, said means to adjust comprising a splined sleeve on one of said pitman rods and a collar threaded thereabout for the complementary compression of said splined sleeve against the router body, and handle means for moving the router in an elliptical path defined by the rotational limit of said bell crank levers, said handle means forming an extension of one of said pitman rods.

7. In a machine for routing an elliptical pattern, a pair of oppositely disposed allochiral bell crank levers mounted at the fulcrums thereof for rotation in a plane common to the arms thereof, a first pair of arms defined by one arm of each bell crank lever, said first pair of arms being arranged substantially parallel one another, each of said first pair of arms terminating in a means rotatably carrying a pitman rod, said pitman rods being rotatably interconnected at the ends thereof, a second pair of arms arranged opposite to said pitman rods and defined by the other arm of each bell crank lever, the terminal ends of said second pair of arms being mounted for rotation in a common horizontal plane and in correlated arcs about the fulcrums of said bell crank levers, said second arm terminal ends being most close together along the respective arcuate paths of travel thereof when said second arms are in alignment, and a single stop means mounted immediately adjacent said most close point of arcuate travel for abutment selectively by either and by both of said second arm terminal ends, said single stop means being adjustable for movement a preselected distance along said paths of travel to vary the precise point of abutment.

CHARLES CARLSON.

REFERENCES CITED

The following references are of record in the file of this patent:

UNITED STATES PATENTS

| Number | Name | Date |
|---|---|---|
| 1,129,400 | Johnston | Feb. 23, 1915 |
| 1,506,154 | Berthelsen et al. | Aug. 26, 1924 |
| 1,899,883 | Sacrey | Feb. 28, 1933 |
| 2,091,450 | Miller | Aug. 31, 1937 |
| 2,116,122 | Ocenasek | May 3, 1938 |